May 9, 1933.  C. W. RICE  1,907,583
TOTALLY INCLOSED DYNAMO ELECTRIC MACHINE
Filed May 28, 1930
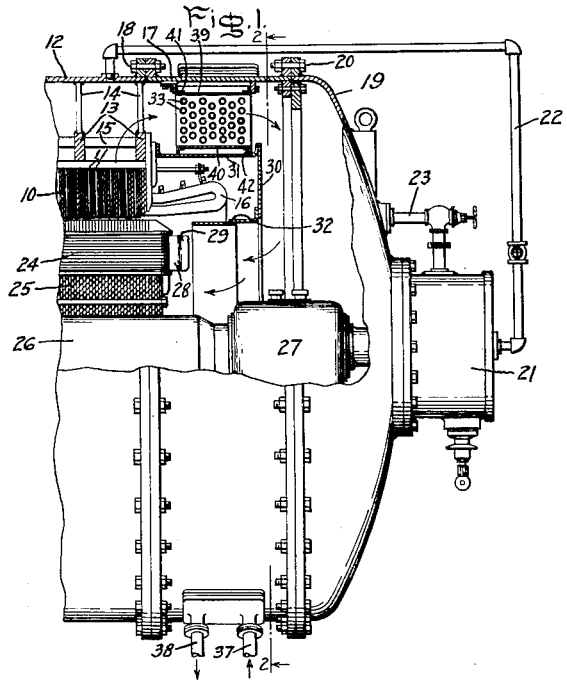
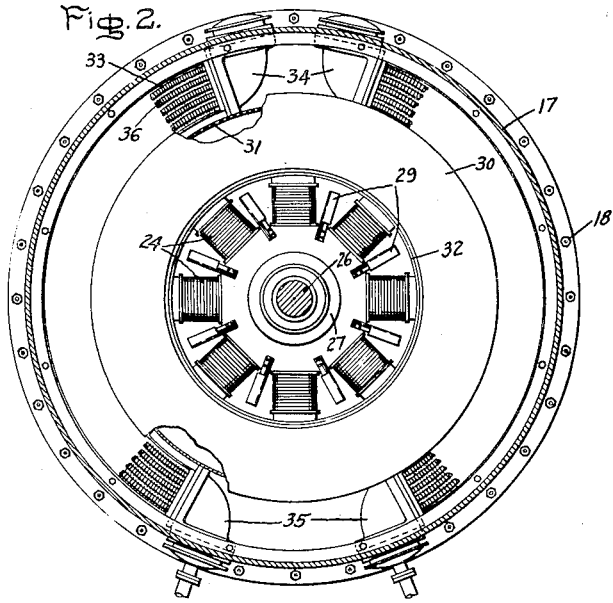
Inventor:
Chester W. Rice,
by Charles E. Tullar
His Attorney.

Patented May 9, 1933

1,907,583

UNITED STATES PATENT OFFICE

CHESTER W. RICE, OF SCHENECTADY, NEW YORK, ASSIGNOR TO GENERAL ELECTRIC COMPANY, A CORPORATION OF NEW YORK

TOTALLY INCLOSED DYNAMO-ELECTRIC MACHINE

Application filed May 28, 1930. Serial No. 456,599.

My invention relates to totally inclosed dynamo-electric machines of the type in which a cooling gas such as hydrogen, air, or other suitable gas, is circulated within the machine and over the surfaces of coolers which carry away the heat absorbed by the circulating cooling gas.

The object of my invention is to provide a simple and compact construction in which the coolers are arranged inside of the machine in the path of the cooling gas circulated therein. I accomplish this by providing a dynamo-electric machine having rotatable and stationary members, a cylindrical housing inclosing the machine in which a cooling gas is circulated, and arcuate coolers in the housing for cooling the gas circulated therein.

My invention will be more fully set forth in the following description referring to the accompanying drawing, and the features of novelty which characterize my invention will be pointed out with particularity in the claims annexed to and forming a part of this specification.

Fig. 1 is a fragmentary side elevation of a totally inclosed dynamo-electric machine embodying my invention partly broken away to more clearly show the construction, and Fig. 2 is a sectional view approximately on the line 2—2 of the Fig. 1.

Referring to the drawing, I have shown my invention in connection with a dynamo-electric machine including a stationary member comprising a laminated core structure 10 provided with radial ducts 11 therein which is supported inside of a cylindrical housing 12 by annular rings 13, radial bars 14 welded to the rings and to the housing, and reinforcing bars 15 welded to the rings. A winding is arranged in slots in the core structure 10 in the usual manner and the end-turns thereof are indicated at 16. A removable section 17 is bolted to the housing 12 at 18, and an end-head 19 is bolted to the section 17 at 20 so as to totally inclose the machine. A casing 21 is provided, for inclosing the current collecting devices of the machine secured to the shaft therein, which communicates with the high pressure portion of the housing by a pipe 22, and with the lower pressure portion thereof by a pipe 23. The particular inclosure for the current collecting devices forms no part of my invention, but is the invention of Earl S. Henningsen which is described and claimed in his application, Serial No. 456,608, filed May 28, 1930, Patent No. 1,883,912, granted October 25, 1932, which is assigned to the same assignee as the present application. The rotatable member of the machine is arranged inside of the core structure 10 and includes a plurality of pole pieces 24 secured to a spider 25 which is supported on a shaft 26 carried by bearings 27 mounted in the removable section 17, it being understood that both ends of the machine are similar to the portion thereof illustrated in the drawing.

The housing 12 of this machine is preferably filled with hydrogen gas which is circulated within the machine by the action of the pole pieces 24 and impeller blades 28 provided with peripherally extending shrouds 29. By this arrangement the cooling gas is drawn into the end of the rotatable member and impelled outwardly through the ducts 11 in the core structure from whence it flows from the outer periphery of the core structure around the rings 13 and into the end of the rotatable member, as indicated by the arrows in Fig. 1.

A simple and compact arrangement of coolers for cooling the gas circulated in the machine in this manner is provided, in accordance with my invention, by arranging an annular baffle ring 30 at the end of the stationary member having a cylindrical portion 31 extending to the end of the stationary member adjacent the outer periphery of the core structure 10, and a cylindrical portion 32 at the inner periphery thereof terminating adjacent the impeller blades carried by the pole pieces of the rotatable member, so that the cooling gas is directed from the outer periphery of the core structure of the stationary member through the end head 19 and into the impeller blades 28 carried by the pole pieces of the rotatable member. Arcuate coolers 33 are arranged between the cylindrical extension 31 of the baffle ring and the removable section 17 of the inclosing housing of the machine. These coolers include elbows 34 and 35 secured to the removable section and having a plurality of arcuate finned tubes 36 connecting the elbows. The elbows 35 are provided with inlets 37 communicating with one group of the tubes 33 for the flow of cooling water through the tubes to the elbows 34, from whence the cooling water is returned to the elbows 35 through another group of the tubes 33 to the outlet connections 38.

In order to direct the cooling gas circulating between the annular extension 31 of the baffle ring and the removable section 17 of the housing more intimately in contact with the finned tubes 36, I provide arcuate baffle plates 39 and 40 which extend about the outer and inner periphery of the arcuate coolers respectively and are supported in the housing by angles 41 and 42. In this construction the arcuate coolers 33 with their baffles 39 and 40, and the baffle 30 with its cylindrical extensions 31 and 32 are all supported in the removable section 17 which is bolted to the end of the housing 12. By this arrangement the coolers and baffles can be made separately from the main housing 12 and then bolted thereto with the cylindrical extension 31 of the baffle 30 abutting the end of the core supporting structure of the machine. In this way the construction of the machine is simplified, and the coolers can be readily replaced without entirely dismantling the machine.

Although I have shown my invention in connection with a dynamo-electric machine of a particular type, I do not desire to be limited thereto, and I intend in the appended claims to cover all modifications which do not depart from the spirit and scope of my invention.

What I claim as new and desire to secure by Letters Patent of the United States, is,—

1. A totally inclosed dynamo-electric machine having rotatable and stationary members, means including a housing spaced from said stationary member for inclosing the machine, said housing having a removable section secured to the end thereof, a baffle at the end of said stationary member cooperating with said housing to provide a path for the flow of cooling gas between the end of said rotatable member and the outer periphery of said stationary member, and an arcuate cooler arranged between said baffle and said housing, said baffle and said cooler being carried by said removable section of said housing.

2. A totally inclosed dynamo-electric machine having rotatable and stationary members provided with windings, means including a housing spaced from said stationary member for inclosing the machine, said housing having a removable section secured to the end thereof, a baffle plate arranged at the end of said stationary member and having cylindrical portions extending adjacent the inner and outer periphery of said stationary member so as to provide for the flow of air about the end turns of the winding of said stationary member, and an arcuate cooler arranged between the outer cylindrical extension of said baffle and said housing, said baffle with its cylindrical portions and said cooler being carried by said removable section of said housing.

3. A totally inclosed dynamo-electric machine having a rotatable and a stationary member provided with a core structure having air ducts, means including a housing spaced from said core structure for inclosing the machine, said housing having a removable section secured to the end thereof, a baffle at the end of said stationary member for directing air from the outer periphery of said core structure into the end of said rotatable member, an arcuate cooler secured to said housing and arranged between said baffle and said housing, said baffle and said cooler being carried by said removable section of said housing, and means carried by said rotatable member for circulating cooling gas outwardly through the ducts in said core structure and into the end of said rotatable member.

In witness whereof, I have hereunto set my hand this 27th day of May, 1930.

CHESTER W. RICE.